United States Patent
Hommel et al.

(10) Patent No.: US 9,527,589 B2
(45) Date of Patent: Dec. 27, 2016

(54) METHOD FOR PROTECTING A PASSENGER AND ARRANGEMENT CONSISTING OF A FOLDING TABLE AND A SEAT SCREEN

(71) Applicant: LUFTHANSA SYSTEMS GmbH & CO. KG, Raunheim (DE)

(72) Inventors: Peter Hommel, Bad Homburg (DE); Mohamed Lakhloufi, Russelheim (DE); Christian Habich, Gravenwiesbach (DE); Jorg Liebe, Wiesbaden (DE); Patrick Poetzsch, Kronberg (DE); Eckart Wallis, Mannheim (DE)

(73) Assignee: Lufthansa Systems GMBH & Co. KG, Raunheim (DE)

( * ) Notice: Subject to any disclaimer, the term of this patent is extended or adjusted under 35 U.S.C. 154(b) by 0 days.

(21) Appl. No.: 14/653,516

(22) PCT Filed: Dec. 20, 2013

(86) PCT No.: PCT/EP2013/077602
§ 371 (c)(1),
(2) Date: Jun. 18, 2015

(87) PCT Pub. No.: WO2014/096316
PCT Pub. Date: Jun. 26, 2014

(65) Prior Publication Data
US 2015/0336672 A1    Nov. 26, 2015

(30) Foreign Application Priority Data
Dec. 20, 2012  (DE) .......................... 10 2012 224 091

(51) Int. Cl.
*A47B 83/02*   (2006.01)
*B64D 11/00*   (2006.01)
(Continued)

(52) U.S. Cl.
CPC .............. *B64D 11/0015* (2013.01); *A47B 5/04* (2013.01); *A47B 31/06* (2013.01); *B60N 3/004* (2013.01);
(Continued)

(58) Field of Classification Search
CPC ... B64D 11/015; B64D 11/06; B64D 11/0638; A47B 31/06; A47B 5/04; B60N 3/004; B60R 11/0235
(Continued)

(56) References Cited

U.S. PATENT DOCUMENTS 5,720,515 A      2/1998  Haffner
8,934,063 B2 *   1/2015  Boyer, Jr. .......... B64D 11/0015
                                                  297/146 X
(Continued)

FOREIGN PATENT DOCUMENTS

DE          4340189         11/1993
FR          2883529          3/2005
WO       WO2012/129116       9/2012

OTHER PUBLICATIONS

International Search Report and Written Opinion for PCT/EP2013/077602 dated Jul. 22, 2014, 8 pgs.

Primary Examiner — Rodney B White
(74) Attorney, Agent, or Firm — Brinks Gilson & Lione

(57) ABSTRACT

To increase the safety of a passenger in a means of transport and to better protect the passenger from an in-seat screen, wherein a folding table and at least one in-seat screen arranged above the folding table are provided in front of the passenger, and the folding table has a first folded position when the folding table is not in use and a second folded position for using the table which is pivoted with respect to the first folded position through approximately 90°, the method is characterized in that at least a portion of the folding table can be moved in front of the in-seat screen in (Continued)

order to protect the passenger from the screen. A corresponding arrangement is also provided.

14 Claims, 5 Drawing Sheets

(51) Int. Cl.
    *A47B 5/04*     (2006.01)
    *A47B 31/06*     (2006.01)
    *B64D 11/06*     (2006.01)
    *B60N 3/00*     (2006.01)
    *B60R 11/02*     (2006.01)
    *B60R 11/00*     (2006.01)

(52) U.S. Cl.
    CPC ........... *B60R 11/0235* (2013.01); *B64D 11/06* (2013.01); *B64D 11/0638* (2014.12); *B60R 2011/0015* (2013.01); *B60R 2011/0094* (2013.01)

(58) Field of Classification Search
    USPC .................................................. 297/146, 163
    See application file for complete search history.

(56) References Cited

U.S. PATENT DOCUMENTS

| | | | |
|---|---|---|---|
| 9,167,905 B2* | 10/2015 | Pajic | A47C 7/70 |
| 2006/0075934 A1* | 4/2006 | Ram | B60N 3/004 |
| | | | 108/44 |
| 2006/0175882 A1* | 8/2006 | Schweizer | B60N 2/4876 |
| | | | 297/146 X |
| 2013/0093220 A1* | 4/2013 | Pajic | A47C 7/70 |
| | | | 297/163 |
| 2016/0176356 A1* | 6/2016 | Krikorian | B60R 11/02 |
| | | | 224/275 |

\* cited by examiner

METHOD FOR PROTECTING A PASSENGER AND ARRANGEMENT CONSISTING OF A FOLDING TABLE AND A SEAT SCREEN

RELATED APPLICATIONS

This application claims priority to International Application No. PCT/EP2013/077602, filed Dec. 20, 2013, and to German Application No. 10 2012 224 091.8, filed Dec. 20, 2012. All of the foregoing applications are hereby incorporated by reference in their entirety.

BACKGROUND

The invention relates to a method for protecting a passenger from an in-seat screen, as well as to an arrangement consisting of a folding table and an in-seat screen in a means of transportation, such as an airplane.

SUMMARY

Passenger seats, in particular in an airplane, are typically equipped with folding tables arranged in front of the seat such that the folding table can be stowed away in a folding position corresponding to a position of non-use, and can be folded upward for use into a second folding position corresponding to a position of use. Both in the position of non-use and in the position of use, the folding table can be locked. In case a further passenger seat is arranged in front of the passenger seat, the folding table is pivotably fastened on the rear of the backrest of the front passenger seat. If no further seat is arranged in front of the relevant passenger seat, but rather a cabin wall, the folding table may be mounted on the cabin wall.

Moreover, seats for passengers in means of transportation such as airplanes, coaches, trains, ships or cars, are frequently equipped with an in-seat screen situated in front of the passenger, e.g. in the rear of the backrest of the front seat or in a cabin wall in front of the passenger seat. The in-seat screen may be a fixedly installed screen or a removable screen similar to a tablet PC. In this case, the in-seat screen can be stowed away at least in front of the passenger in the backrest or in the cabin wall. The in-seat screen is situated above the folding table assigned to the passenger seat.

Fixtures in an airplane should meet certain safety criteria in order to minimize the risk of injuries for passengers, in particular during take-off and during landing. With in-seat screens, one safety risk is that in case of damage to the screen, glass or the housing breaks and sharp edges can be formed at the level of the passenger's head.

It is an object of the invention to increase the safety of a passenger in a means of transportation and to enhance the protection of the passenger from an in-seat screen.

The method of the invention is defined by the features of claim 1. The present arrangement consisting of a folding table and a seat screen is defined by the features of claim 9.

According to the method of the present invention, at least a portion of the folding table is positioned in a protective position in front of the screen in order to protect the passenger from the screen. In this context, it is conceivable that the protective position is a third folding position which is situated preferably above the first and second folding positions. On the other hand, it is also conceivable that the portion of the folding table that is adapted to be placed in the protective position is pivotable with respect to a portion of the folding table that, in the position of use, serves as a support. While the portion serving as a support remains in the position of use or in the position of non-use, the protective portion of the folding table can be pivoted in front of the same. A third alternative may provide that the protective portion of the folding table is displaceable with respect to the portion of the folding table serving as a support. For example, a protective plate can be pulled out of the folding table, e.g. when the folding table is in the position of non-use. Typically, when in the position of non-use, the folding table is arranged below the seat screen in parallel with the backrest of the respective front seat. The protective portion of the folding table can then be displaced upward in parallel with the backrest to a position in front of the screen, in which it can be locked. It is desirable that the protective portion is adapted to be locked. Moreover, the protective portion or even the entire folding table should be made of a transparent material.

Thus, in the present arrangement consisting of a folding table and a seat screen, at least one portion (protective portion) of the folding table can be positioned in a protective position in which the seat screen is covered at least in portion, seen in the viewing direction of the passenger. In the protective position, the relevant portion of the folding table forms a sort of a protective shield between the seat screen and the passenger. In this regard, the folding table should advantageously be locked in the protective position in order to prevent an inadvertent release from the protective position. The folding table is in the protective position at least during take-off and during landing of an airplane. If required, the folding table may also be folded into and remain in the protective position at other times, e.g. during an emergency landing.

Typically, the first folding position of the table is a lower folding position which, with a deviation of a few degrees, lies in a vertical plane or parallel to the rear of the backrest of the front seat. From this first folding position, in which the table is stowed away during non-use, it is deployed, for use, by about 90° (except for a deviation of a few degrees) into an intermediate folding position which is the position of use. In the position of use, meals, beverages and other objects can be placed on the table within reach of the passenger. The third folding position is pivoted upward by about another 90°, except for a deviation of a few degrees, as the protective folding position, so that the third folding position is pivoted by about 180° with respect to the first folding position.

In this manner, as provided by the invention, the seat screen can be covered in a simple manner, if so desired, to protect a passenger from the seat screen without requiring the provision of additional covers or shields. Rather, the folding table, which is present anyway, is supplemented by a further function—the passenger protection function. In this regard, it is particularly advantageous if the folding table is at least partly transparent such that it allows viewing the seat screen when it is folded into the third folding position (protective position). During take-off and during landing, an airplane passenger is protected from the screen and can still watch videos on the screen, e.g. safety videos containing information about the behavior in emergency situations.

As an addition, it is conceivable to provide a shutter that can be positioned in front of the seat screen. The shutter may be in the form of a roller shutter, a sliding shutter or an attachable shutter, and may be mounted to the backrest of the respective seat, for example. The shutter can be used to cover the seat screen if the protective portion of the folding table is not available or cannot be used.

DETAILED DESCRIPTION OF THE PREFERRED EMBODIMENTS

Figure 1:
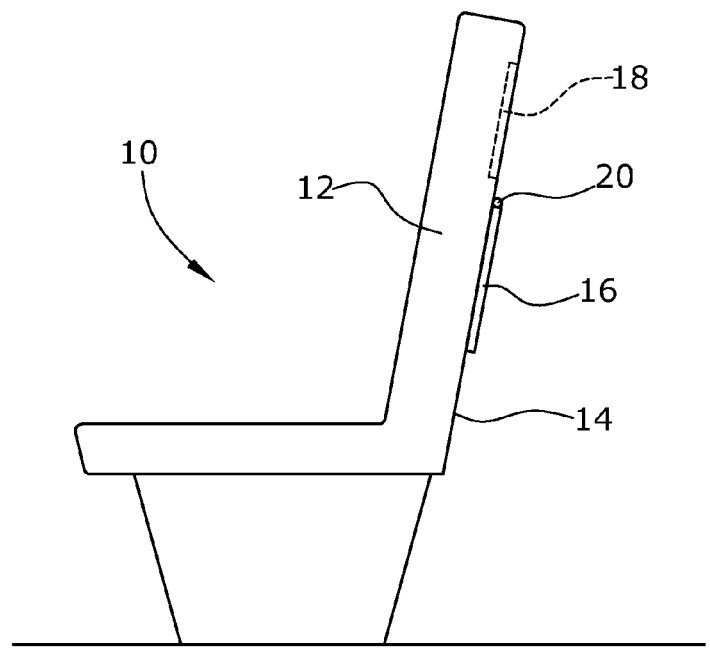
FIG. 1 is a first embodiment in a first position of use.
Figure 2:
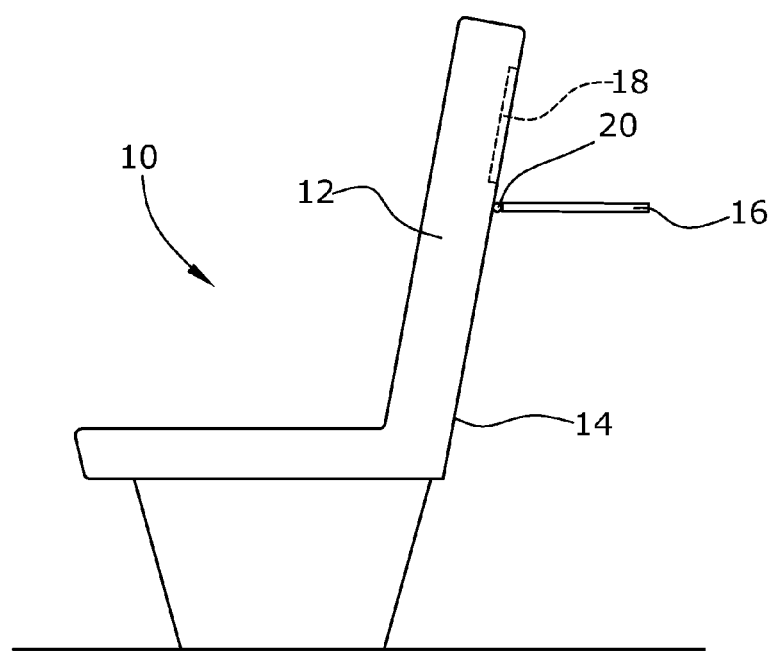
FIG. 2 is the arrangement in FIG. 1 in a second position of use.
Figure 3:
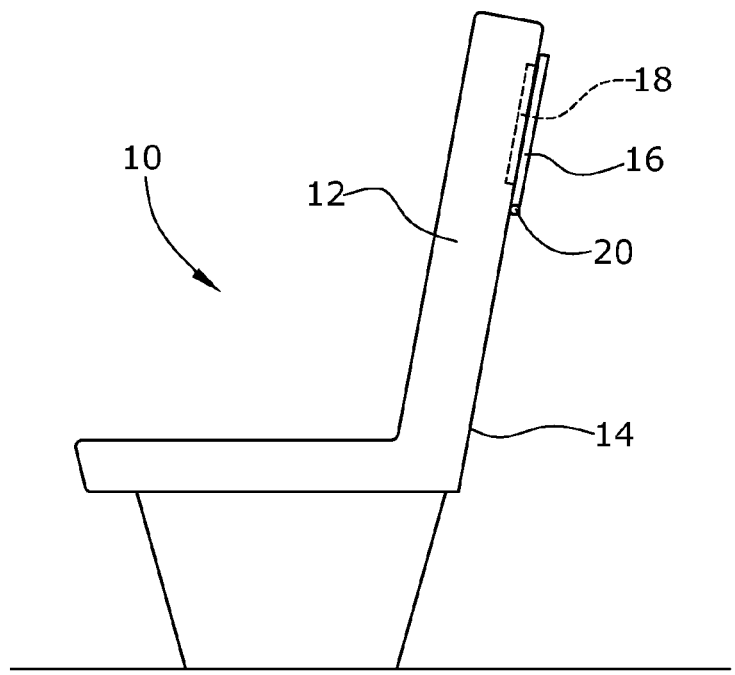
FIG. 3 is the arrangement in FIG. 1 in a third position of use.

FIGS. 1-3 illustrate the first embodiment comprising an airplane seat 10 with the backrest 12 thereof. On the rear 14 of the backrest 12, a pivotable folding table 16 and an in-seat screen 18 are mounted. The in-seat screen 18 is a removable flat screen in the form of a tablet PC which is held in a detent holder in the position illustrated in the Figures so as to allow watching films. Here, the screen 18 is configured as a touchscreen.

The folding table 16 is connected with the backrest 12 through a hinge 20. FIG. 1 illustrates the folding table 16 in a lower, first folding position in which the folding table 16 is stowed away during non-use. In this folding position, the folding table 16 is situated below the hinge 20 and in parallel with the rear 14 of the backrest 12.

For use, the folding table 16 can be pivoted into the second, intermediate folding position illustrated in FIG. 2, in which position the folding table 16 is lockingly retained in a horizontal plane. In this second folding position, the folding table 16 is used to place meals, beverages or other objects within reach of the passenger.

During take-off and during landing of the airplane, the folding table 16 is pivoted into the third folding position illustrated in FIG. 3. The third folding position is a protective position in which the in-seat screen 18 is entirely covered by the folding table 16. The folding table 16 will lock in the third folding position in order to prevent an inadvertent release of the screen 18. In the protective position, the folding table 16 forms a means of protection, in particular for the head of the passenger, from the screen 18, since the screen is arranged approximately at head level of a sitting passenger. Since the screen 18 is embedded in the backrest 12 of the airplane seat 10 such that the screen surface is flush with the rear 14 of the backrest 12, the screen 18 is entirely surrounded by the backrest 12 and the folding table 16, when the folding table 16 is in its protective position. The backrest 12 and the folding table 16 thus form a sort of protective housing for the screen 18.

Figure 4:
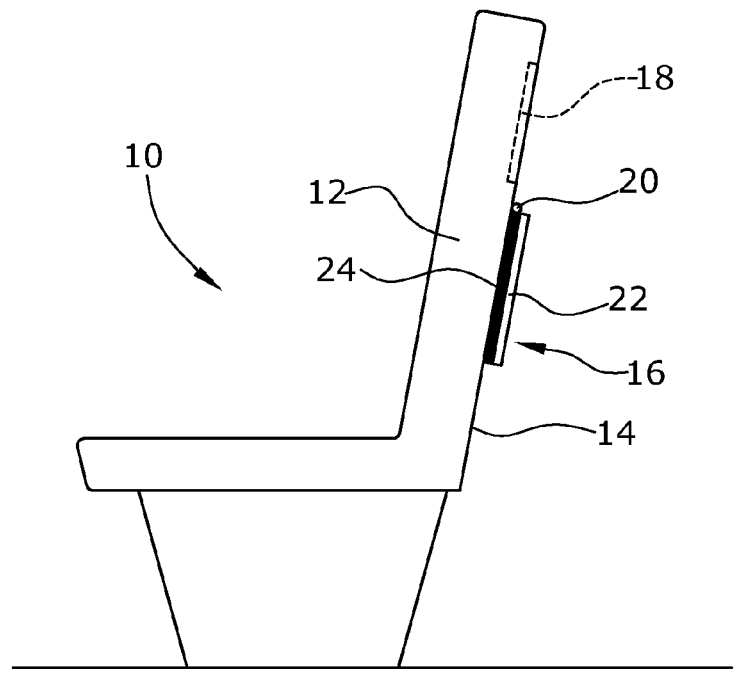
FIG. 4 is a second embodiment in the first folding position.
Figure 5:
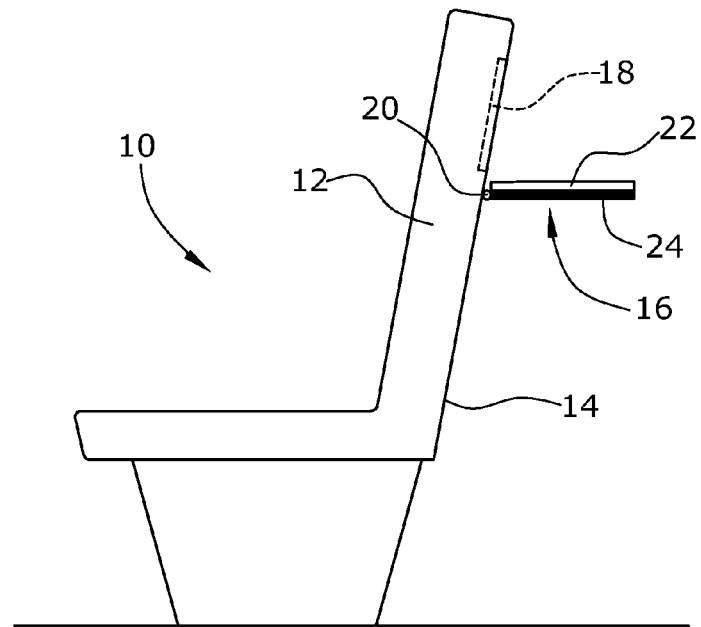
FIG. 5 is the second embodiment in the second folding position.
Figure 6:
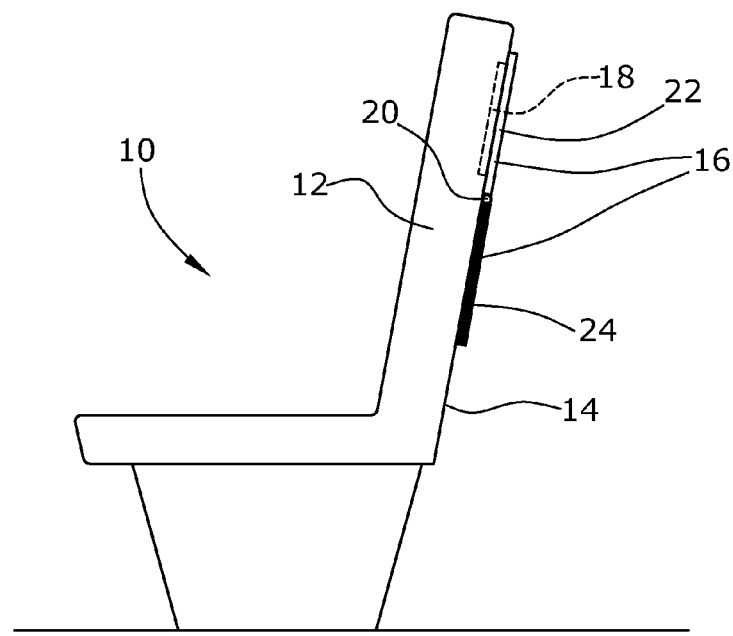
FIG. 6 is the second embodiment in the protective position.

FIGS. 4-6 illustrate the second embodiment which differs from the first embodiment in that, in the protective position, not the entire folding table 16 is pivoted and locked in front of the screen 18. Rather, only a portion 22 of the folding table 16, as illustrated in FIG. 6, is pivoted in front of the screen 18 in the protective position. This protective portion 22 is fully transparent so that the screen 18 can still be viewed in the protective position illustrated in FIG. 6. In the Figures, the remaining portion 24 of the folding table 16 is blackened in order to make clear that this portion 24 is not transparent. This remaining portion 24 is the portion 24 which, as illustrated in FIG. 5, substantially serves as a support, when the folding table 16 is in its position of use. Here, the portion 24 has a static supporting function allowing objects to be placed on the folding table 16. In the protective position illustrated in FIG. 6, the support portion 24 of the folding table 16 is in its position of non-use, i.e. parallel to the rear 14 of the backrest 12 of the front seat, while the protective portion 22 is pivoted upward by 180° with respect to the support portion 24 to a position in front of the seat screen 18, where it is locked.

Figure 7:
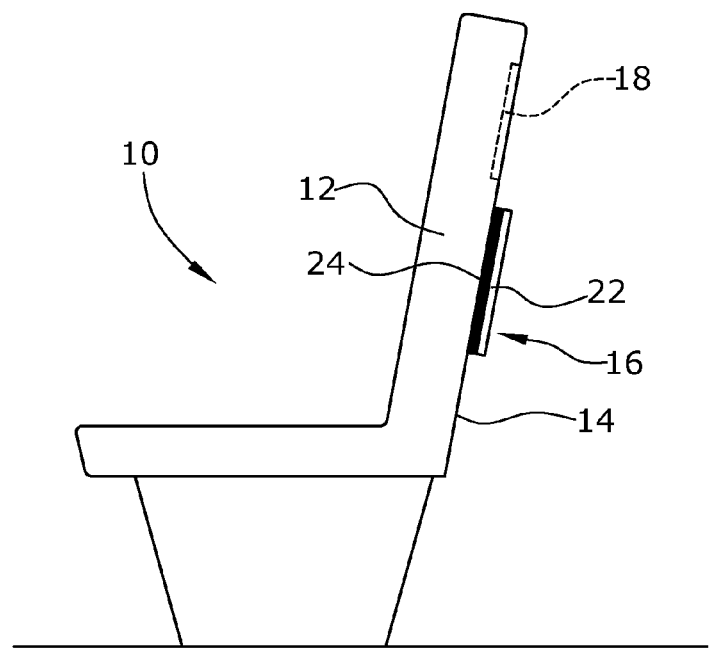
FIG. 7 is a third embodiment in the first folding position.
Figure 8:
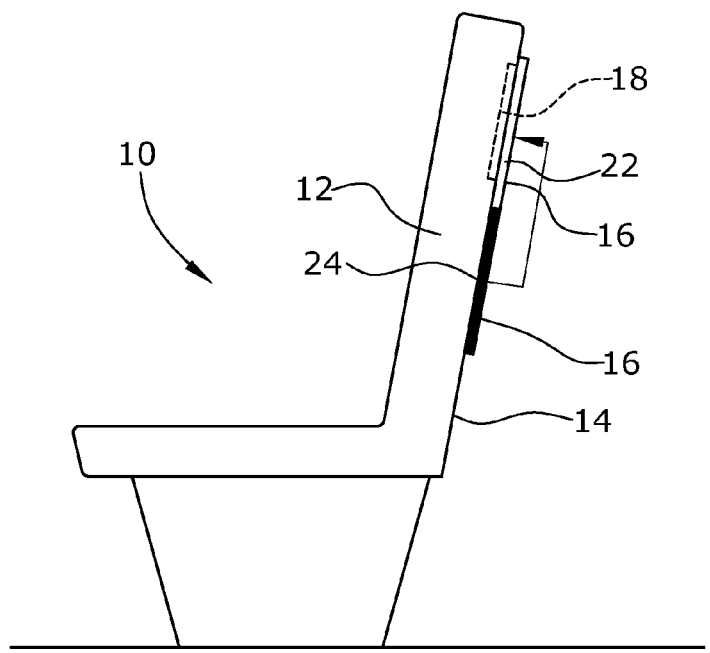
FIG. 8 is the third embodiment in the protective position.

A third embodiment is illustrated in FIGS. 7 and 8. This embodiment differs from the second embodiment in that the protective portion 22 of the folding table 16 is not pivoted relative to the support portion 24 but, in the manner of a drawer, is displaced upward with respect to the support portion 24 along the backrest 12 until it is in front of the seat screen 18 and covers the same.

Figure 9:
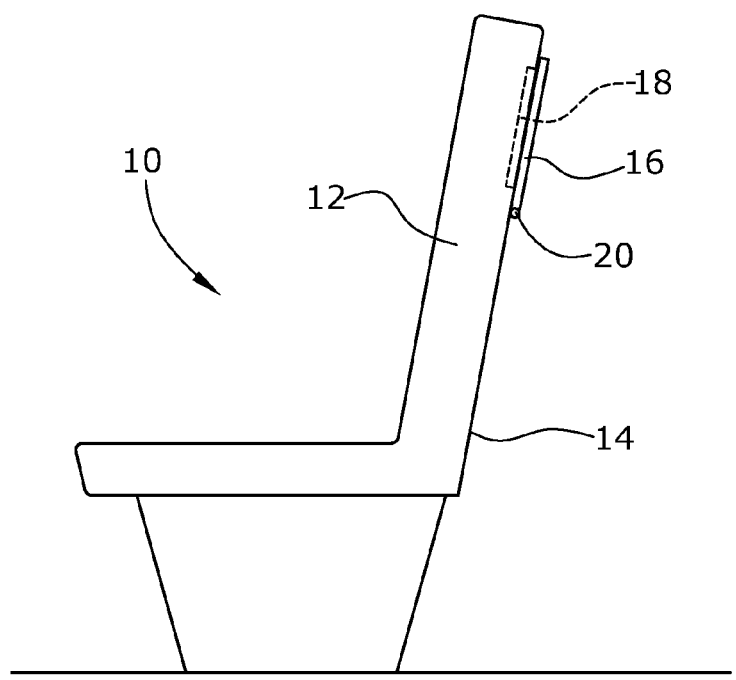
FIG. 9 is a fourth embodiment in the first folding position.
Figure 10:
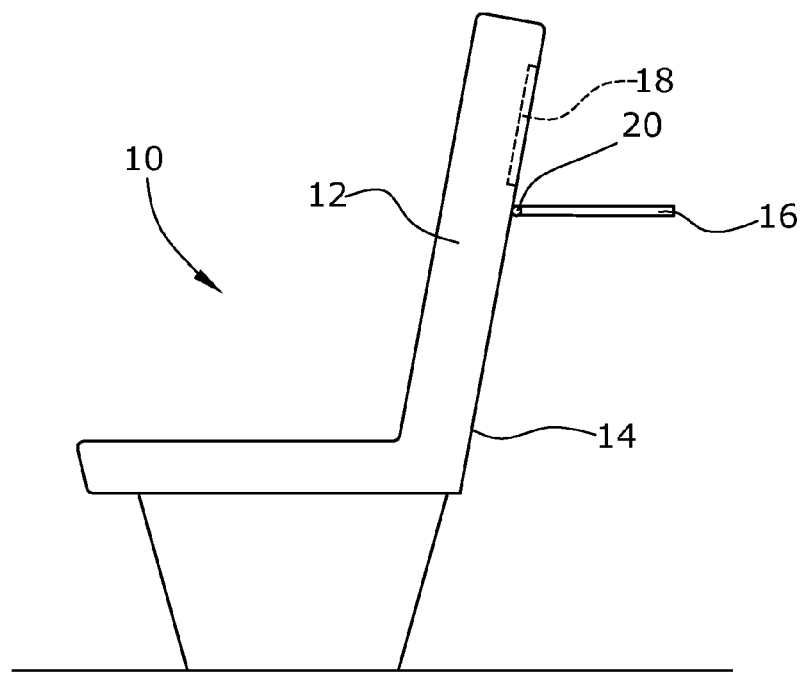
FIG. 10 is the fourth embodiment in the second folding position.

The embodiment in FIGS. 9 and 10 relates to a completely transparent folding table 16, whose first folding position during non-use, as illustrated in FIG. 9, at the same time corresponds to the protective position for protecting the passenger from the screen 18. For use, the folding table is pivoted down from the first folding position and the protective position illustrated in FIG. 9 by about 90° to the second folding position illustrated in FIG. 10.

In addition, each of the embodiments may comprise a shutter, not illustrated in the Figures, to cover the in-seat screen. The shutter may be configured as a rolling shutter, a sliding shutter or an attachable shutter in order to cover the screen 18 when the protective portion 22 of the folding table 16 is not available or cannot be used. Further, the shutter can be used to further enhance the protection of a passenger by covering the screen both by the shutter and the protective portion 22 of the folding table 16. In the case of a rolling shutter or a sliding shutter, the same may be fastened above or laterally of the screen on the backrest of the seat and may be moved vertically or horizontally to be positioned in front of the screen. In the case of an attachable shutter, the same may be set on or clamped on the seat screen. For this purpose, a receptacle may be fastened to the rear of the passenger seat to receive the attachable shutter.

What is claimed is:

1. A method for protecting a passenger in a means of transportation equipped with at least one foldable table arranged in front of the passenger and at least one in-seat screen arranged above the folding table, wherein the folding table has a first folding position when the folding table is not in use, and has a second folding position for using the table, in which second folding position the table is pivoted by about 90° with respect to the first folding position, wherein at least a portion of the folding table is adapted to be positioned in front of the in-seat screen to protect the passenger from the screen, wherein the first folding position is a lower folding position and the second folding position is an intermediate folding position above the lower folding position wherein for the purpose of protecting the passenger, the folding table is pivoted to an upper folding position above the lower and intermediate folding positions.

2. The method of claim 1, wherein the method is performed in an airplane during take-off, during landing and/or in emergency situations of the airplane.

3. The method of claim 1, wherein in the upper folding position, the table is pivoted by about 180° with respect to the lower folding position and by about 90° with respect to the intermediate folding position.

4. The method of claim 1, wherein in the protective position, the at least one portion of the folding table is positioned in front of the in-seat screen such that the screen is fully covered by said portion of the folding table.

5. The method of claim 4, wherein the portion of the folding table is pivotable with respect to another portion of the folding table which serves as a support when the folding table is in the position of use and which can be folded to be in front of the in-seat screen.

6. The method of claim 4, wherein the portion of the folding table is displaceable with respect to another portion of the folding table which serves as a support when the folding table is in the position of use.

7. The method of claim 6, wherein the displaceable portion of the folding table is adapted to be displaced from the first folding position in front of the in-seat screen to cover the same.

8. An arrangement comprising a folding table in a means of transportation and a seat screen arranged above the folding table, wherein the folding table is fastened to a base by means of hinges such that it is adapted to be positioned in a first folding position when the folding table is not in use and in which the screen can be operated, and is adapted to be positioned in a second folding position for using the folding table, in which position the screen can be operated, wherein at least a portion of the folding table is adapted to be positioned in a protective position in which the folding table covers the screen at least partly;

wherein the first folding position is a lower folding position, the second folding position is an intermediate folding position above the first folding position, and the protective position is an upper folding position above the first and second folding positions.

9. The arrangement of claim 8, wherein, in the first folding position and the protective position, the folding table is arranged in a vertical plane, while the folding table is arranged in a horizontal plane when in the second folding position, wherein the hinges of the folding table are adapted to be pivoted by at least 180°.

10. The arrangement of claim 8, wherein, in the protective position, the folding table completely covers the in-seat screen.

11. The arrangement of claim 8, wherein the folding table is adapted to be locked in the protective position.

12. The arrangement of claim 8, wherein the folding table is transparent at least in part such that the in-seat screen can be viewed in the protective position.

13. The arrangement of claim 8, wherein the portion of the folding table, which can be positioned in the protective position, is adapted to be displaced, relative to the remaining portion of the folding table, from the first folding position in front of the seat screen.

14. The arrangement of claim 8, wherein a shutter is provided for covering the in-seat screen, the shutter being adapted to be positioned in front of the in-seat screen.

* * * * *